United States Patent
Sowizral et al.

(10) Patent No.: US 6,731,304 B2
(45) Date of Patent: May 4, 2004

(54) USING ANCILLARY GEOMETRY FOR VISIBILITY DETERMINATION

(75) Inventors: Henry A. Sowizral, Bellevue, WA (US); Karel Zikan, Seattle, WA (US); Randall G. Keller, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 143 days.

(21) Appl. No.: 10/012,595

(22) Filed: Dec. 6, 2001

(65) Prior Publication Data

US 2002/0163515 A1 Nov. 7, 2002

Related U.S. Application Data

(60) Provisional application No. 60/254,049, filed on Dec. 6, 2000.

(51) Int. Cl.[7] .............................................. G06T 17/00
(52) U.S. Cl. ........................................ 345/622; 345/421
(58) Field of Search ................................. 345/419, 420, 345/421, 422, 423, 424, 426, 427, 428, 619, 620, 621, 622, 623, 624, 625, 626, 627, 628

(56) References Cited

U.S. PATENT DOCUMENTS 5,914,721 A 6/1999 Lim

OTHER PUBLICATIONS

Klosowski et al. "Rendering on a Budget: A Framework for Time–Critical Rendering" IEEE 1999.*
Weghorst et al. "Improved Computational Methods for Ray Tracing" ACM 1984.*
International Search Report, application No. PCT/US01/46862, mailed Jul. 12, 2002.

* cited by examiner

Primary Examiner—Almis R. Jankus
(74) Attorney, Agent, or Firm—Meyertons Hood Kivlin Kowert & Goetzel, P.C.; Jeffrey C. Hood; Mark K. Brightwell

(57) ABSTRACT

A system and method for determining graphical object visibility by utilizing ancillary geometry. When comparing visibility cones with bounding hulls of scene graph hierarchy leaf nodes, ancillary geometry may be used in place of the bounding hulls and the leaf node's actual geometry. The ancillary geometry may be created through a manual process, or by an automated decimation process. The ancillary geometry may be a simplistic analytic surface (e.g., a sphere or a cylinder), a NURB surface, a collection of polygons, or a combination of surfaces and polygons.

29 Claims, 9 Drawing Sheets

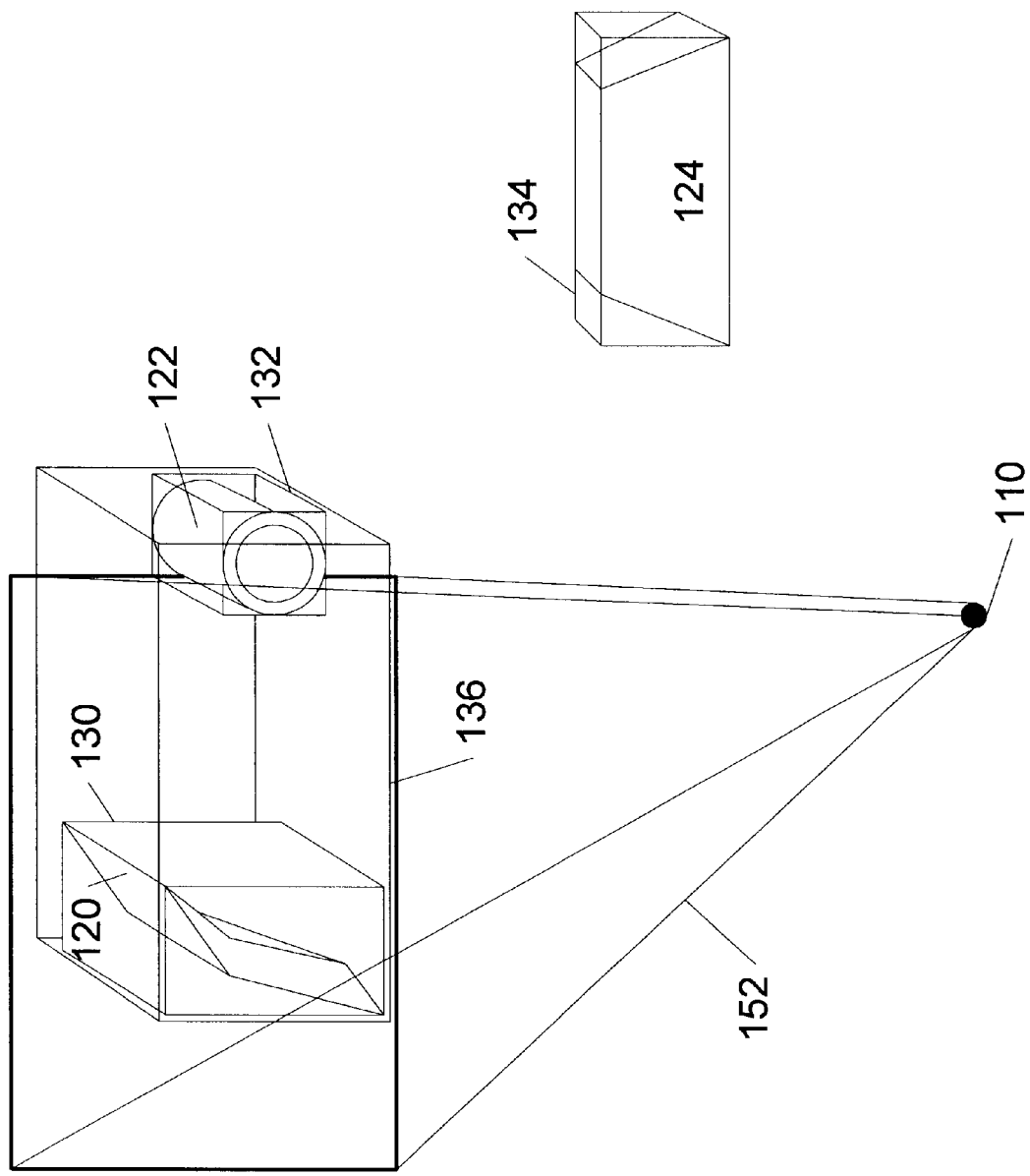

USING ANCILLARY GEOMETRY FOR VISIBILITY DETERMINATION

CROSS REFERENCES TO RELATED APPLICATIONS

This application claims the benefit of U.S. Provisional Application No. 60/254,049 filed on Dec. 6, 2000 entitled "Using Ancillary Geometry for Visibility Determination".

BACKGROUND OF THE INVENTION

1. Field of the Invention

The present invention generally relates to computer graphics, and more particularly, to the process of rendering three-dimensional objects.

2. Description of the Related Art

Visualization software has proven to be very useful in evaluating three-dimensional designs long before the physical realization of those designs. In addition, visualization software has shown its cost effectiveness by allowing engineering companies to find design problems early in the design cycle, thus saving them significant amounts of money. Unfortunately, the need to view more and more complex scenes has outpaced the ability of graphics hardware systems to display them at reasonable frame rates. As scene complexity grows, visualization software designers need to carefully use the rendering resource provided by graphic hardware pipelines.

A hardware pipeline wastes rendering bandwidth when it discards rendered triangle work. Rendering bandwidth waste can be decreased by not asking the pipeline to draw triangles that it will discard. Various software methods for reducing pipeline waste have evolved over time. Each technique reduces waste at a different point within the pipeline. As an example, software culling of objects falling outside the view frustum can significantly reduce discards in a pipeline's clipping computation. Similarly, software culling of back-facing triangles can reduce discards in a pipeline's lighting computation.

The z-buffer is the final part of the graphics pipeline that discards work. In essence, the z-buffer retains visible surfaces, and discards those not visible because they are behind another surface (i.e. occluded). As scene complexity increases, especially in walk-through and CAD environments, the number of occluded surfaces rises rapidly and as a result the number of surfaces that the z-buffer discards rises as well. A frame's average depth complexity determines roughly how much work (and thus rendering bandwidth) the z-buffer discards. In a frame with a per-pixel depth complexity of d the pipeline's effectiveness is 1/d. As depth complexity rises, the hardware pipeline thus becomes proportionally less and less effective.

Software occlusion culling has been proposed as an additional tool for improving rendering effectiveness. A visualization program which performs occlusion culling effectively increases the overall rendering bandwidth of the graphics hardware by not asking the hardware pipeline to draw occluded objects. Computing a scene's visible objects is the complementary problem to that of occlusion culling. Rather than removing occluded objects from the set of objects in a scene or frustum-culled scene, a program instead computes which objects are visible and instructs the rendering hardware to draw just those. A simple visualization program can compute the set of visible objects and draw those objects from the current viewpoint, thus allowing the pipeline to focus on removing backfacing polygons and the z-buffer to remove any non-visible surfaces of those objects.

One technique for computing the visible object set uses ray casting. RealEyes [Sowizral, H. A., Zikan, K., Esposito, C., Janin, A., Mizell, D., "RealEyes: A System for Visualizing Very Large Physical Structures", SIGGRAPH '94, Visual Proceedings, 1994, p. 228], a system that implemented the ray casting technique, was demonstrated in SIGGRAPH 1994's BOOM room. At interactive rates, visitors could "walk" around the interior of a Boeing 747 or explore the structures comprising Space Station Freedom's lab module.

The intuition for the use of rays in determining visibility relies on the properties of light. The first object encountered along a ray is visible since it alone can reflect light into the viewer's eye. Also, that object interposes itself between the viewer and all succeeding objects along the ray making them not visible. In the discrete world of computer graphics, it is difficult to propagate a continuum of rays. So a discrete subset of rays is invariably used. Of course, this implies that visible objects or segments of objects smaller than the resolution of the ray sample may be missed and not discovered. This is because rays guarantee correct determination of visible objects only up to the density of the ray samples.

Visible-object determination has its roots in visible-surface determination. Foley et al. [Foley, J., van Dam, A., Feiner, S. and Hughes, J. Computer Graphics: Principles and Practice, 2nd ed., Addison-Wesley, Chapter 15, pp. 649–718, 1996] classify visible-surface determination approaches into two broad groups: image-precision and object-precision algorithms. Image precision algorithms typically operate at the resolution of the display device and tend to have superior performance computationally. Object precision approaches operate in object space-usually performing object-to-object comparisons.

A prototypical image-precision visible-surface-determination algorithm casts rays from the viewpoint through the center of each display pixel to determine the nearest visible surface along each ray. The following references describe various applications of visible-surface ray casting (or ray tracing).

Appel ["Some Techniques for Shading Machine Rendering of Solids", SJCC'68, pp. 37–45, 1968] uses ray casting for shading.

Goldstein and Nagel [Mathematical Applications Group, Inc., "3-D Simulated Graphics Offered by Service Bureau," Datamation, 13(1), February 1968, p. 69.; see also Goldstein, R. A. and Nagel, R., "3-D Visual Simulation", Simulation, 16(1), pp. 25–31, 1971] use ray casting for boolean set operations.

Kay et al. [Kay, D. S. and Greenberg, D., "Transparency for Computer Synthesized Images," SIGGRAPH'79, pp.158–164] and Whitted ["An Improved Illumination Model for Shaded Display", CACM, 23(6), pp.343–349, 1980] use ray tracing for refraction and specular reflection computations.

Airey et al. [Airey, J. M., Rohlf, J. H. and Brooks, Jr. F. P., "Towards Image Realism with Interactive Update Rates in Complex Virtual Building Environments", ACM SIGGRAPH Symposium on Interactive 3D Graphics, 24, 2(1990), pp. 41–50] uses ray casting for computing the portion of a model visible from a given cell.

Another approach to visible-surface determination relies on sending beams or cones into a database of surfaces [see Dadoun et al., "Hierarchical approachs to hidden surface intersection testing", Proceeedings of Graphics Interface '82, Toronto, May 1982, 49–56; see also Dadoun et al., "The geometry of beam tracing", In Joseph O'Rourke, ed., Proceeedings of the Symposium on Computational Geometry, pp.55–61, ACM Press, New York, 1985]. Essentially, beams become a replacement for rays. The approach usually results in compact beams decomposing into a set of possibly non-connected cone(s) after interacting with an object.

A variety of spatial subdivision schemes have been used to impose a spatial structure on the objects in a scene. The following four references pertain to spatial subdivision schemes:

(a) Glassner, "Space subdivision for fast ray tracing," IEEE CG&A, 4(10):15–22, October 1984;

(b) Jevans et al., "Adaptive voxel subdivision for ray tracing," Proceedings Graphics Interface '89, 164–172, June 1989;

(c) Kaplan, M. "The use of spatial coherence in ray tracing," in Techniques for Computer Graphics . . . , Rogers, D. and Earnshaw, R. A. (eds), Springer-Verlag, N.Y., 1987; and (d) Rubin, S. M. and Whitted, T. "A 3-dimensional representation for fast rendering of complex scenes," Computer Graphics, 14(3):110–116, July 1980.

Kay et al. [Kay, T. L. and Kajiya, J. T., "Ray Tracing Complex Scenes", SIGGRAPH 1986, pp. 269–278,1986], concentrating on the computational aspect of ray casting, employed a hierarchy of spatial bounding volumes in conjunction with rays, to determine the visible objects along each ray. Of course, the spatial hierarchy needs to be precomputed. However, once in place, such a hierarchy facilitates a recursive computation for finding objects. If the environment is stationary, the same data-structure facilitates finding the visible object along any ray from any origin.

Teller et al. [Teller, S. and Sequin, C. H., "Visibility Preprocessing for Interactive Walkthroughs," SIGGRAPH '91, pp.61–69] use preprocessing to full advantage in visible-object computation by precomputing cell-to-cell visibility. Their approach is essentially an object precision approach and they report over 6 hours of preprocessing time to calculate 58 Mbytes of visibility information for a 250,000 polygon model on a 50 MIP machine [Teller, S. and Sequin. C. H., "Visibility computations in polyhedral three-dimensional environments," U.C. Berkeley Report No. UCB/CSD 92/680, April 1992].

In a different approach to visibility computation, Greene et al. [Greene, N., Kass, M., and Miller, G., "Hierarchical z-Buffer Visibility," SIGGRAPH '93, pp.231–238] use a variety of hierarchical data structures to help exploit the spatial structure inherent in object space (an octree of objects), the image structure inherent in pixels (a Z pyramid), and the temporal structure inherent in frame-by-frame rendering (a list of previously visible octree nodes). The Z-pyramid permits the rapid culling of large portions of the model by testing for visibility using a rapid scan conversion of the cubes in the octree.

As used herein, the term "octree" refers to a data structure derived from a hierarchical subdivision of a three-dimensional space based on octants. The three-dimensional space may be divided into octants based on three mutually perpendicular partitioning planes. Each octant may be further partitioned into eight sub-octants based on three more partitioning planes. Each sub-octant may be partitioned into eight sub-suboctants, and so forth. Each octant, sub-octant, etc., may be assigned a node in the data structure. For more information concerning octrees, see pages 550–555, 559–560 and 695–698 of Computer Graphics: principles and practice, James D. Foley et al., $2^{nd}$ edition in C, ISBN 0-201-84840-6, T385.C5735, 1996.

The depth complexity of graphical environments continues to increase in response to consumer demand for realism and performance. Thus, the efficiency of an algorithm for visible object determination has a direct impact on the marketability of a visualization system. The computational bandwidth required by the visible object determination algorithm determines the class of processor required for the visualization system, and thereby affects overall system cost. Thus, improved systems and methods for performing visible object determination are greatly desired.

Furthermore, the visibile object set estimated by the visible object determination algorithm should be closely approximate the actual set of visible objects. If the algorithm significantly over-estimates the set of visible objects, computational bandwidth is wasted rendering objects that are not really visible. If the algorithm significantly under-estimates the set of visibile objects, the missing objects which should be present in the displayed image are not likely to go unnoticed by the user. Thus, there exists a significant need for a visibility determination system and method which more accurately estimates the set of visible objects with respect to current viewpoint.

SUMMARY OF THE INVENTION

The problems outlined above may at least in part be solved by a system and method that are configured to utilize ancillary geometry for object culling. A visibility algorithm (e.g., one using cones or rays) is applied to either individual bounding hulls or a hierarchy of bounding hulls. Once a particular ray or cone is determined to intersect the smallest bounding hull corresponding to a particular object, an additional comparison may be performed applying the same ray or cone to ancillary geometry associated with the object. Advantageously, the ancillary geometry may be configured to more closely approximate the object than the bounding hull.

In various embodiments, the methods described herein may be implemented as a software program on a programmable processor, in dedicated hardware, or in a combination of programmable hardware and dedicated hardware. The software program may be implemented as part of an application programming interface (API), as part of graphics application, a browser, or as part of a graphics system driver.

In one embodiment, the method for performing visibility culling includes receiving a scene graph having graphics data that describes a plurality of graphics objects (each object may comprise a plurality of graphics primitives such as polygons, subdivision surfaces, or NURBS). Next, bounding hulls for the graphics objects may be determined. These bounding hulls may in turn be combined (i.e. recursively grouped) to form a hierarchy of larger bounding hulls. A visibility frustum for the current viewpoint may be selected and compared with the larger bounding hulls. Next, ancillary geometry may be determined for one or more of the objects that have bounding hulls falling within the visibility frustum. Once the ancillary geometry data is determined, it may be stored to memory and linked to the scene graph via pointers.

In some implementations, the geometry data associated with a particular level of detail may be used as the ancillary geometry data. To avoid inordinate processing load, the level of detail chosen to define the ancillary geometry for a graphics object is typically lower than the highest level of detail available for the graphics object. However, the level of detail used for rendering the object is independent of the level of detail used for the ancillary geometry. For example, a high level of detail may be rendered, but a low level of detail may be used as the ancillary geometry for visibility determination. Once the ancillary geometry is selected or generated, it is then compared with one or more cones or rays within the visibility frustum that originate at the selected viewpoint. If the cones or rays intersect the ancillary geometry before intersecting any other object, then the corresponding object is selected (e.g., tagged) for rendering.

In some embodiments, the method may include detecting visible changes (e.g., deformations, translations, or rotations) in one or more of the objects, and then updating the ancillary geometry accordingly (e.g., updating at least the changed objects).

The ancillary geometry may be determined by selecting a particular set of geometry data from a group of different levels of detail for the corresponding object. Alternatively, the ancillary geometry data may be determined by using vertex decimation. In yet another embodiment, the ancillary geometry is pre-generated and accompanies the object's geometry data. The ancillary geometry may also be determined by replacing a number $N_p$ of graphics primitives with a single graphics primitive that approximates the $N_p$ primitives. For example, a number of polygons creating a cylindrical shape may be replaced with a cylinder.

The method may be implemented as a computer program that is configured to receive information regarding a scene graph (including graphics data describing a plurality of graphics objects). As noted above, the software may be configured to compare a portion of a selected visibility frustum with a bounding hull corresponding to one or more of the graphics objects. If the portion of the selected visibility frustum intersects the bounding hull, then the portion of the selected visibility frustum is compared with ancillary geometry corresponding to the one or more graphics objects. If the portion of the selected visibility frustum intersects the ancillary geometry, then the corresponding graphics object or objects are identified for possible rendering. The ancillary geometry may preferably have more information than the bounding hull and less information than the graphics data corresponding to the object as a whole. As noted above, different techniques may be used to determine the ancillary geometry, including vertex decimation.

BRIEF DESCRIPTION OF THE DRAWINGS

The foregoing, as well as other objects, features, and advantages of this invention may be more completely understood by reference to the following detailed description when read together with the accompanying drawings in which:

FIG. 1 illustrates one example of bounding hulls for object culling;

Figure 2A:
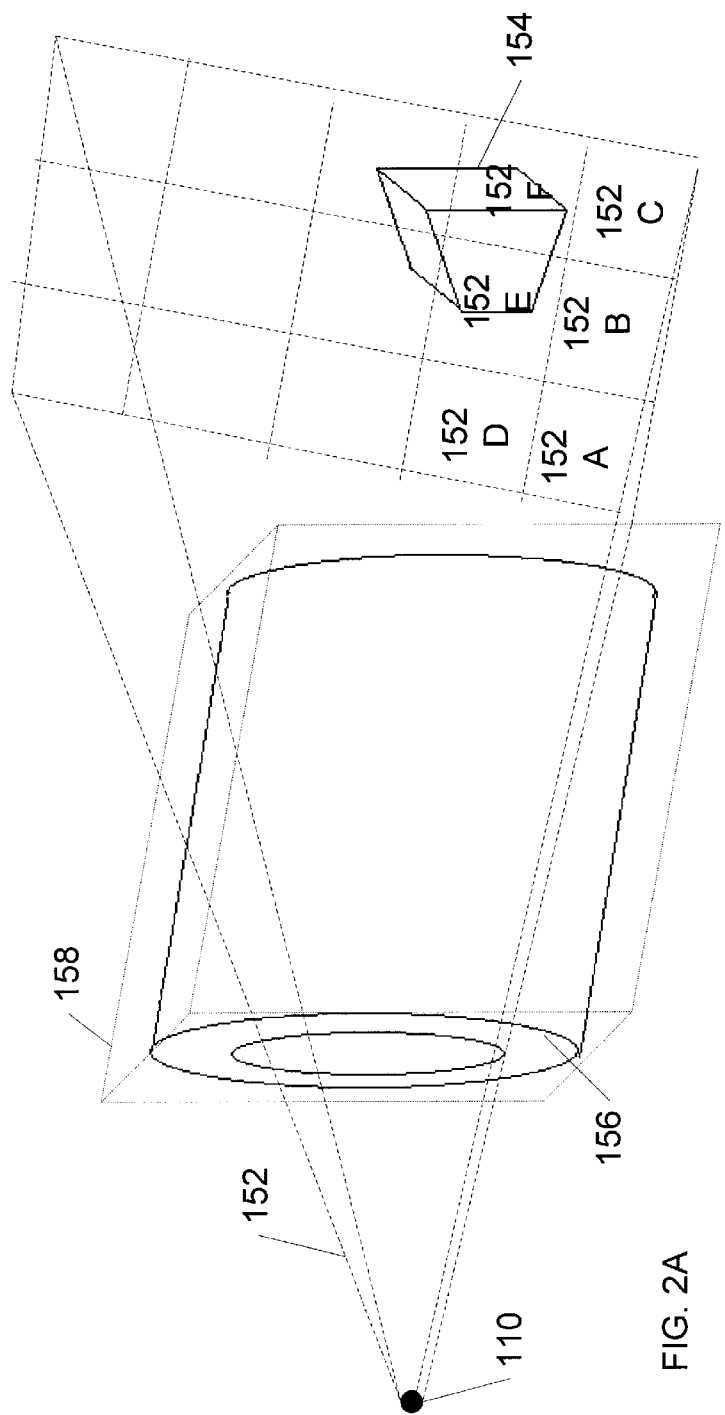
FIGS. 2A–B illustrate one example of an object that occludes much less than the volume of its bounding hull 158 would indicate.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF SEVERAL EMBODIMENTS

A space of any dimension may be represented as a union of cones. Convex polygonal cones may be convenient for such representations. A convex polygonal cone is a cone whose cross section is a convex polygon. A convex polygonal cone C may be expressed as the solution set of the vector inequality of the form $$Sx \leq 0,$$

where the rows of matrix S are normal vectors defining the planar boundaries of the cone C, where x is a vector variable. The vector inequality $a \leq b$ between two vectors a and b is true if and only if $a_i \leq b_i$ for all i. When S is empty, the cone C equals the entire space. When S has only one row, the cone C is a half-space. Other characterizations of a cone are possible and other embodiments based on these other characterizations are contemplated.

Most objects may be bounded by a polytope hull. A polytope hull is a convex solid whose surfaces are planar. A polytope hull H may be expressed as the solution set of the vector inequality $$Ax \leq b,$$

where the rows of matrix A are the normal vectors for the planar boundaries of the hull H, where b is a vector of displacement values specifying where along each of the normal lines (generated by the normal vectors) the corresponding boundary plane is to be positioned. For convenience, the hull H may be summarized by the notation (A,b).

Given a collection of objects distributed in a coordinate space, a tree of bounding hulls may be constructed as follows. Each of the objects may be bounded by a corresponding hull. Groups of these first order hulls may be bounded by second order hull. Groups of the second order hulls may be bounded by third order hulls, and so on, until there is a single bounding hull enclosing the whole collection of objects. At each stage, groups of objects (or hulls) may be generated based on proximity. For example, a clustering algorithm may be used to generate the groups of objects (or hulls).

Each node in the hull tree may include the matrix A and the vector b for the corresponding spatial hull. If the matrix A is common to all hulls, each hull is uniquely characterized by the vector b and it is not necessary to store the matrix A with each hull. Each hull node may include pointers to children nodes for its subhulls.

Similarly, the ambient space may be recursively partitioned to generate a tree of cones. The tree of cones may be constructed from the top down as follows. The whole space may be interpreted as a global cone (i.e. as the union of all rays emanating from the origin). The space may be partioned into some number of first order subcones. The first order subcones may be partitioned into second order subcones, and so on, until at some ultimate refinement level, the subcones are fine enough for the purpose at hand. For example, in some graphical applications, ultimate subcones (referred to herein as leaf cones) subtend a screen area equal to a pixel area or some fraction of a pixel area. Each node in the cone tree may include the matrix S characterizing the corresponding spatial cone. Each cone node may also include pointers to nodes for its subcone children.

A visibility search procedure may perform a dual tree search on the cone tree and the hull tree to determine the subset of objects which are visible with respect to a current viewpoint and/or view direction. The visibility search procedure operates on cone-hull pairs. Before exploring a cone C with respect to a hull H, the distance between the cone C and the hull H is computed. This involves determining the minimum distance to points residing in both the hull and the cone from the vertex of the cone. Thus, the cone-hull distance may be interpreted as a distance of the hull as seen within the cone. This cone-hull distance is then compared to a visibility distance value associated with the cone.

In one set of embodiments, the cone-hull distance d(C,H) between a cone C and a hull H may be defined as $$\min<v,x>: Ax \leq b \text{ and } Sx \leq 0$$

where v is a vector interior to (or polar to) the cone C, where $<v,x>$ is the dot product (or, more generally, an inner product) of the vector v and the vector x. The constraint $Ax \leq b$ implies that the point x resides within the hull H. The constraint $Sx \leq 0$ implies that the point x resides within the cone C. In one embodiment, vector v may be set equal to $v = -S^T e$ where vector e is the vector of all ones. (It is noted that the matrix S of cone normals are outward normals to the cone surfaces. Thus, the negation of the sum of the normal vectors gives a polar vector.) Other schemes of computing the extent of separation (proximity) between a cone and a hull are possible, and various embodiments along these alternative lines are contemplated.

If the cone C and the hull H have an empty intersection, the minimum may be set equal to positive infinity. Note that the computation of the distance d(C,H) given above is a linear programming problem.

The process of evaluating the cone-hull distance between the cone C and the hull H is referred to as a cone-hull query. If the query indicates an empty intersection between the cone C and hull H, it is immediately apparent that none of the descendents of cone C can intersect any of the descendents of hull H.

The visibility search procedure may search the cone tree and hull tree starting with the root cone and the root hull. Each leaf-cone may be assigned a visibility distance value which represents the distance to the closest known object as perceived from within the leaf-cone. Each leaf-cone may also be assigned an object attribute which specifies the closest known object (or hull) within view of the leaf-cone. Similarly, each non-leaf cone may be assigned a visibility distance value. However, the visibility distance value of a non-leaf cone may be set equal to the maximum of the visibility distance values for its subcone children. This implies that the visibility distance value for each non-leaf cone equals the maximum of the visibility distance values of its leaf-cone descendents. (Before any objects have been examined, the visibility distance values of all cones may be set equal to positive infinity corresponding to infinite visibility and the object pointers of all cones may be set equal to the nominal infinite background object.)

If the cone-hull distance is larger than the visibility distance value of the cone, all of the leaf-cone descendents of the given cone have known visible objects closer than the given hull by definition of the visibility distance value. Thus, there may be little benefit in exploring the cone-hull pair. In contrast, if the cone-hull distance is smaller than the visibility distance value of the cone, the hull may contain objects which will affect the visibility distance values of one or more leaf-cone descendents of the given cone. The cone-hull pair may be searched.

Thus, cone-hull pairs are advantageously searched when there is a significant probability that the given hull may affect the visibility of the cone's descendents. Thus, the visibility search procedure may avoid unnecessary cone-hull explorations and thereby saves considerable computational bandwidth.

Supposing that the search condition is satisfied, the hull is explored with respect to the given cone. If the cone C and hull H are both leaves of their respective trees, the leaf hull may correspond to an object which is closer than the closest known object for the leaf-cone. To determine whether or not the object really does occlude the closest known object for the leaf cone, the visibility search procedure may access the object's ancillary geometry from memory. The leaf hull may include a pointer to the ancillary geometry for the object. The ancillary geometry comprises bounding information which is more precise than the leaf hull but more compact memory-wise than the actual primitive data (e.g. triangles) for the object. The visibility search procedure may compute or estimate the distance of the object as represented by its ancillary geometry from vertex of the leaf cone as seen within the leaf cone. If the leaf cone does not intersect the ancillary geometry, this "ancillary distance" may be set equal to positive infinity. The ancillary distance may be compared to the visibility distance value of the leaf cone. If the ancillary distance is smaller than the visibility distance value of the leaf cone, the visibility distance value of the leaf-cone may be updated with the ancillary distance. Also, the object attribute for the cone may be updated to point to the given hull.

Thus, a leaf cone which is looking through the center of a lion tamer's hoop may intersect the bounding hull for the hoop. But when the ancillary geometry for the hoop is accessed and examined, the leaf cone may discover that it really does not interact with the hoop. Thus, the visibility distance value and the object pointer for the leaf cone will not be updated by the hoop object. When the visibility search procedure eventually gets to the object representing the lion's head (imagine a lion behind the hoop and staring through the center of the hoop), the leaf cone will intersect with the bounding hull of the lion's head. Furthermore, an investigation of the ancillary geometry for the lion's head will reveal that the leaf cone does intersect the lion's head. Thus, the visibility distance value for the leaf cone will be updated with the ancillary distance to the lion's head and the object pointer for the leaf cone will be updated with the pointer to the lion's head. The visibility search procedure is able to avoid a misleading adjustment of the visibility distance value of the leaf cone because it resorts to the ancillary geometry for a more precise investigation of cone-object interaction.

In the case that the cone C is a leaf-cone and the hull H is a non-leaf hull, the visibility search procedure may examine subhulls of the given hull, and conditionally explore these subhulls in ascending order of their cone-hull distance from the given cone. Again, exploration of a subhull may be conditioned upon the subhull achieving a cone-hull distance to the given cone which is smaller than the cone's visibility distance value.

In the case that the cone C is a non-leaf cone and the hull H is a leaf hull (i.e. one which bounds a corresponding object), the visibility search procedure may conditionally explore subcones of the given cone with respect to the object $OBJ_H$ corresponding to the leaf hull. Exploration of a subcone may be conditioned upon the subcone achieving an ancillary distance to the object $OBJ_H$ which is smaller than the subcone's visibility distance value. The ancillary distance of the subcone with respect to the object $OBJ_H$ may be defined as the minimum distance of points in the intersection of the subcone and the object $OBJ_H$ (as defined by the object's ancillary geometry) with respect to the vertex of the subcone.

Thus, in response to non-leaf cone C and leaf hull H achieving a cone-hull distance which is less than the visibility-distance value of the cone C, the visibility search procedure may estimate the ancillary distance of each subcone of cone C with respect to the object $OBJ_H$, and search the subcone with respect to the object $OBJ_H$ if the ancillary distance is smaller than the visibility distance value of the subcone.

In the case that the cone C is a non-leaf cone and the hull H is a non-leaf hull, the visibility search procedure may conditionally explore subhulls of the given hull against the subcones of the given cone. Consider a particular subcone of the given cone for the sake of discussion. The subhulls of the given hull are conditionally explored against the subcone in ascending order of their cone-hull distances from the subcone. Because the closest subhull is searched first, and potentially decreases the visibility distance value of the given subcone, succeeding (more distant) subhulls will have more difficulty passing the search condition, i.e. of having a cone-hull distance to the given subcone which is less than the visibility distance value of the subcone. Thus, the probability is maximized that the fewest number of subhulls will need to be explored by ordering the conditional explorations according to cone-hull distance.

When the search of the two trees is completed, the object attribute of each leaf-cone points to the object which is visible to the leaf-cone, and the visibility distance value of the leaf-cone specifies the distance to the visible object. This visibility information may be provided to a graphics accelerator so that the graphics accelerator may render the visible objects (or visible portions of visible object) on the display device.

In one embodiment, the visibility search procedure is implement by visualization software executing on one or more programmable processors. The visualization software may provide for interactive visualization by reading user inputs to control the current viewpoint and view-direction in the graphics environment. Additional software may operate to efficient computation through the use of careful state management and parallelism.

In one alternative embodiment, the cone tree and hull tree are searched iteratively. In a second alternative embodiment, a level order search is performed on the cone tree and the hull tree.

Any of a variety of techniques for measuring the extent of separation or proximity between a hull and a cone may be substituted for the cone-hull distance described above. In one set of embodiments, a separation measure may be computed by minimizing a function of separation distance between the vertex of the cone and points in the intersection of the cone and the hull. (The cone-hull distance described above is one such increasing function of separation distance.) In another set of embodiments, a proximity measure may be computed by maximizing a decreasing function of separation distance between the vertex of the cone and points in the intersection of the cone and the hull. In general, any wavefront with a boundary that obeys a mild "star shape" condition may provide the basis for a measurement of separation between a hull and a cone. Thus, various alternative embodiments are contemplated along these lines.

In another set of embodiments, each leaf-cone of the cone tree may store N object distances and N object pointers corresponding to the N closest known objects as perceived within the leaf cone from the common vertex (i.e. viewpoint) of the cone tree. Each leaf cone may additionally store a visibility distance value which represents the distance to the $N^{th}$ closest object, i.e. the last of the N closest objects. Similarly, each non-leaf cone may be assigned a visibility distance value. However, the visibility distance value of a non-leaf cone may be set equal to the maximum of the visibility distance values for its subcone children. This implies that the visibility distance value for each non-leaf cone equals the maximum of the visibility distance values of its leaf-cone descendents.

As described above, the visibility search procedure implements a dual-tree search of the cone tree and the hull tree. The dual tree search may be illustrated in terms of a non-leaf cone C of the cone tree structure and a non-leaf hull H of the hull tree structure. The visibility search procedure may be implemented in software on a processor (or a plurality of processors). In one set of embodiments, the processor may compute a cone size for the cone C and a hull size for the hull H, and may compare the cone size and the hull size. If the hull size is larger than the cone size, the processor may conditionally search subhulls of the hull H with respect to the cone C. A subhull of the hull H may be searched against the cone C if the subhull achieves a cone-hull distance with respect to the cone C which is smaller than the visibility distance value associated with the cone C.

If the cone size is larger than the hull size, the processor may conditionally search subcones of the cone C with respect to the hull H. A subcone of the cone C may be searched against the hull H if the subcone achieves a cone-hull distance with respect to the hull H which is smaller than the visibility distance value of the subcone.

A variety of methods are contemplated for computing the cone size and the hull size. By selecting the larger entity (hull H or cone C) for refinement, the visibility search method may, in some embodiments, prune the combined cone-hull tree more effectively, and determine the set of visible objects with increased efficiency.

Eventually the dual-tree search reaches a leaf cone of the cone tree and a leaf hull of the hull tree. In response to attaining a leaf cone and a leaf hull, the processor may:

(a) compute an ancillary distance of the leaf cone with respect to the object X corresponding to the leaf hull;

(b) determine if the ancillary distance is smaller than the visibility distance value associated with the leaf cone;

(c) update the sequence of nearest object distances corresponding to the leaf cone with the ancillary distance; and (d) update the sequence of nearest object pointers corresponding to the leaf cone with the pointer to object X.

Operations (c) and (d) may be performed in response to determining that the ancillary distance is smaller than the visibility distance value associated with the leaf cone. The ancillary distance is computed based on the object's ancillary geometry. The sequence of nearest object positions is ordered by magnitude. The processor determines where the ancillary distance belongs in the sequence of nearest object distances and injects the ancillary distance in the sequence of nearest object distances at the appropriate sequence position. The processor also injects the object pointer associated with the object X at the same relative position in the sequence of nearest object pointers. Upon completing the dual-tree search, the processor may transmit the nearest object pointers (or a stream of triangles corresponding to the nearest object pointers) for the leaf cone to a rendering agent for rendering and display. The rendering agent may comprise a hardware rendering unit. In an alternative embodiment, the rendering agent may comprise a software renderer executed by the same processor or a different processor.

After the update operations (c) and (d), the processor may set the visibility distance value for the leaf cone equal to the $N^{th}$ object distance, i.e. the last of the N nearest object distances.

In some embodiments, each object in the object collection may be classified as an occluder or a non-occluder. For example, an object with volume VO may be classified as an occluder or non-occluder based on the magnitude of the volume ratio VO/VCH, where VCH is the volume of a convex hull containing the object. In addition, material and/or optical properties assoicated with the object may contribute a decision on the occluder or non-occluder classification. Objects made of transparent or semi-transparent materials such as glass, various liquids, plastic, fine meshes or fabrics may be classified as non-occluders. A variety of methods are contemplated for the occluder/non-occluder classification.

In addition to determination (b) above, the processor may determine if the leaf hull corresponds to an occluding object. Update operations (c) and (d) may be performed only for occluders. In contrast, objects that are non-occluders may be stored in a non-occluder buffer associated with the leaf cone, i.e. the ancillary distance and object pointer associated with the object may be stored in the non-occluder buffer. Thus, the dual-tree search may identify, for each leaf cone, the N closest occluders and all non-occluders closer than the $N^{th}$ occluder, subject to storage limits in the non-occluder buffer(s). Upon completing the dual-tree search, the processor may transmit the nearest object pointers (i.e. the occluder pointers) and the non-occluder pointers (from the non-occluder buffer) to the rendering agent.

In other embodiments, each leaf object may be assigned an occlusion metric value. The occlusion metric value may measure an extent of occlusion of the object to objects behind it. For example, the occlusion metric value for a object may be proportional to the cube root of the volume of the object. In one embodiment, the occlusion metric value may be proportional to the square root of a maximal bounding area of the object. In another embodiment, the occlusion metric value may be proportional to a diameter (e.g. a maximal diameter) or an average of multiple diameters of the object. In yet another embodiment, the volume VO/VCH may determine the occlusion metric value. In yet another embodiment, the material and/or optical properties of the object may contribute to the computation of the occlusion metric value. A variety of methods are contemplated for assigning an occlusion metric value to a leaf hull.

Each leaf cone may store three lists which describe a collection of nearest objects as perceived within the leaf cone. A leaf cone stores a list of nearest object pointers, a list of corresponding object distances, and a list of corresponding occlusion values. The lists may expand and contract as leaf hulls are discovered during the dual-tree search.

In response to attaining a leaf hull and a leaf cone in the dual-tree search, the processor may:

(a) compute an ancillary distance for the object X corresponding to the leaf hull with respect to the leaf cone;

(b) determine if the ancillary distance is smaller than the visibility distance value associated with the leaf cone;

(c) update the list of object distances corresponding to the leaf cone based on the ancillary distance;

(d) update the list of nearest object pointers corresponding to the leaf cone with an object pointer associated with the object X; and (e) update the list of occlusion values with the occlusion metric value of the object X.

Operations (c), (d) and (e) may be performed in response to determining that the ancillary distance is smaller than the visibility distance value associated with the leaf cone. The ancillary distance is computed based on the object's ancillary geometry.

The processor may continue to add to the three lists for each discovered leaf hull until the sum of the occlusion values reaches an occlusion threshold. When the occlusion threshold is reached, the view of the leaf cone may be assumed to be totally occluded with the currently gathered objects. After the occlusion threshold has been reached, the processor may add a closer object and flush one or more of the farthest objects from the three lists so that the sum of the occlusion values remains less than or equal to the occlusion threshold.

In one set of embodiments, each leaf cone of the cone tree may point to (or store) a collection of probe cones. Probe cones may comprise a subset of the cones from one or more levels below the leaf cone level. The probe cones for a given leaf cone may sample (e.g. uniformly sample) the space subtended by the leaf cone. The processor may perform the dual-tree search to determine a first visible object (e.g. a closest object, or a farthest of N closest objects) for a given leaf cone, and subsequently, may perform a search of the hull tree with respect to probe cones of the leaf cone to determine one or more additional visible objects for the leaf cone. Because the probe cones are smaller than the corresponding leaf cone, they may be able to "see" objects beyond (e.g. around the edges of) the first visible object. After the dual-tree search and the subsequent search, the processor may transmit an indication of the first visible object and the one or more additional visible objects for the given leaf cone to the rendering agent for rendering and display.

In one embodiment, the search of a hull tree with respect to a probe cone may be accelerated by searching a candidate hull only if it achieves a cone-hull distance with respect to the probe cone which is greater than or equal to the known distance to the first visible object determined by the dual-tree search.

In yet another set of embodiments, the visibility search procedure may be implemented in a graphical computation system comprising a plurality of processors, a display device, a shared memory, and optionally a graphics accelerator. The multiple processors execute the visibility search procedure in a parallel fashion. The cone tree and hull tree may be stored in the shared memory. In addition, the shared memory may store a global problem queue. The global problem queue is initially loaded with a collection of hull-cone pairs. Each hull-cone pair points to a hull in the hull tree and a cone in the cone tree.

The multiple processors may couple to the shared memory, and may perform a search of the cone and hull trees to identify one or more nearest objects for a subset of cones (e.g. the leaf cones) in the cone tree. After the multiple processors complete the search of the cone and hull trees, a transmission agent (e.g. the multiple processors, some subset thereof, or another set of one or more processors) may transmit object pointers corresponding to the nearest objects of each cone in the subset (or the graphics primitives corresponding to the nearest objects) to a rendering agent. The rendering agent (e.g. the graphics accelerator, or a software renderer executing on the multiple processors, some subset thereof, or another set of one or more processors) is operable to receive the graphics primitives, to perform rendering computations on the graphics primitives to generate a stream of pixels, and to transmit the pixel stream to the display device.

In some embodiments, each leaf-cone may be assigned a visibility distance value which represents the distance to the closest known object as perceived from within the leaf-cone. Each leaf-cone may also be assigned an object pointer which specifies the closest known object within view of the leaf-cone. Similarly, each non-leaf cone may be assigned a visibility distance value. However, the visibility distance value of a non-leaf cone may be set equal to the maximum of the visibility distance values for its subcone children. This implies that the visibility distance value for each non-leaf cone equals the maximum of the visibility distance values of its leaf-cone descendents.

In one embodiment, each of the plurality of processors is operable to: (a) read a hull-cone pair (H,C) from the global work queue, (b) compute the distance between the hull H and the cone C, (c) to compare the hull-cone distance to a visibility distance associated with the cone C, (d) to write two or more dependent hull-cone pairs to the global problem queue if the hull-cone distance is smaller than the visibility distance of the cone C. The two or more dependent hull-cone pairs may be pairs generated from hull H and the subcones of cone C, or pairs generated from cone C and subhulls of hull H.

Furthermore, when the processor detects that the hull H is a leaf hull of the hull tree and the cone C is a leaf cone of the cone tree, the processor may resort to the ancillary geometry for the corresponding object as described above, and update the visibility information for the leaf cone if the ancillary distance of the object with respect to the cone is smaller than the visibility distance value of the cone C. Updating the visibility information comprises setting the visibility distance value for cone C equal to the ancillary distance, and setting the nearest object pointer associated with cone C equal to a pointer associated with the corresponding object.

In one alternative embodiment, each processor may couple to a local memory containing a local problem queue. Each processor may read and write hull-cone pairs from/to its local problem queue, and access the global problem queue to read initial hull-cone pairs.

In another alternative embodiment, a collection of cones may be selected from the cone tree, i.e. a collection of non-overlapping cones which fill the space of the root cone (i.e. top level cone). The cones of the collection may be distributed among the multiple processors. Each of the multiple processors may perform a search of its assigned cones (i.e. the subtrees of the cone tree defined by these assigned cones) against the hull tree.

A scene graph is a type of data structure. For example, VRML (Virtual Reality Modeling Language) and Java 3D™ both support scene graphs as data structures. Scene graphs are typically a hierarchical organization of graphics and other data that can be used to create a virtual three-dimensional (3D) world. The scene graph describes the three-dimensional world, including the objects it contains, their properties, and how they interact. In addition to graphics data, other data such as sound files can also be incorporated into a scene graph to add additional features to the virtual 3D world.

Using the example of a VRML-enabled browser, when a computer user accesses VRML content across a network, the browser may automatically download a scene graph from a remote server on the network and then store the scene graph in local memory. The browser may then render selected portions of the scene graph that are visible (or audible, in the case of sound information) from the user's current viewpoint (i.e., position and orientation within the virtual world). As the user navigates the virtual world, new objects may become visible (or audible) while others pass from view (or become too distant to be audible).

Scene graphs are useful because they define relationships between objects that define a particular three-dimensional scene or world. For example, a scene graph may represent an entire building and all the furnishings and people that occupy the building. As the scene graph is traversed from the top node, the next level of group nodes may represent particular rooms within the building. Traversing the scene graph one more level may yield group nodes that each represent one person or furniture object (e.g., a chair) in a particular room. Each group node may also have one or more corresponding transform nodes that translate and/or rotate the group node and any additional nodes below the transform node (i.e., child nodes). While many levels are possible within a single scene graph, eventually a traversal of the scene graph will terminate at a leaf node. Leaf nodes typically represent a particular object (e.g., a tea cup or a chair) or a portion of a larger object (e.g., a person's hand or finger). Leaf nodes typically have one or more pointers to graphics data that define the object corresponding to the leaf node. For example, in one embodiment the leaf node may have pointers to data files that include polygons (or NURBS—Non-Uniform Rational B-Splines) defining the shape of the object and texture maps that define the appearance of the object.

Some leaf nodes may also have pointers to a corresponding bounding hull. In one embodiment, a bounding hull is the smallest axis-aligned hull or volume within which the corresponding object or objects fit completely. Bounding hulls (also called bounding boxes or bounding volumes) may be oriented to a convenient set of axes and may be used to perform rapid visible object determination or object culling.

Before a scene graph is submitted for rendering, object culling may be performed. Object culling refers to the process of selectively removing objects from the scene graph. In most implementations of object culling, objects are removed either because they are outside the current view frustum, or because they are occluded (either partially or fully) by other objects. Object culling is particularly useful for complex scene graphs that have a large number of objects. Since current graphics hardware may be unable to achieve satisfactory frame rates when rendering all of the objects in a complex scene graph, object culling attempts to remove the objects that cannot be seen (or heard) from the current viewpoint/orientation. Thus object culling attempts to reduce the wasting of graphics pipeline bandwidth by rendering only those objects that are actually visible to the viewer. For example, assuming that a particular scene graph represents a virtual model of an entire city, if the current viewpoint is close to the base of a particular building, that particular building will obscure those behind it. Thus, assuming that the building is opaque and that no shadows or reflections of other structures behind the particular building are visible, then there is no reason to devote rendering resources to rendering those obscured structures.

As noted above, object culling may rely on a hierarchical system of bounding hulls which contain the collection of objects to be examined. In one set of embodiments, the bounding hulls may be interpreted a defining the outermost edges of groups of one or more objects. These bounding hulls may then be compared with regions of a current visibility frustum (referred to as "cones") to determine which objects may be visible. If a particular visibility cone intersects a particular bounding hull, then the objects within the hull have a possibility of being visible. If, however, no cones intersect a particular bounding hull, then the objects within the hull are not directly visible from the current viewpoint.

Various methods for performing object culling (also referred to herein as visibility determination) are contempalted. For example, one method for visibility determination is taught in U.S. Pat. No. 6,300,965 issued on Oct. 9, 2001 entitled "Visible-Object Determination For Interactive Visualization" filed on Feb. 9, 1999. The following portions of this patent are hereby incorporated by reference:

(a) Column 15, line 27 through Column 16, line 52;

(b) Column 17, line 17 through Column 28, line 48; and (c) FIGS. 4, 9A–9C, 10A–10C, and 11–21.

The visibility determination method disclosed in U.S. Pat. No. 6,300,965 descends the combined cone-hull tree as long as there continues to be non-empty intersection between cones and hulls. Eventually, a cone is compared with a bounding hull that encompasses only a single object (i.e., a leaf hull). The results from this comparison may be used to determine whether or not the object should be rendered and whether or not additional objects behind the current object need to be rendered. For example, in one embodiment small cones called leaf cones may be compared with different bounding hulls. Since the leaf cone may intersect multiple bounding hulls, the leaf cone may maintain a list of pointers to the N closest objects as seen from within the leaf cone and the corresponding object distances. These object pointers are then used to indicate which objects to render.

The theory behind this process is that, assuming that the leaf cone is small enough, then it is unlikely that more than N objects could be seen in the leaf cone from the viewpoint before objects farther back are completely obscured. For example, assuming the leaf cone subtends less than a single pixel in area, storing a small number of objects (e.g., one or two objects) for each leaf cone may be sufficient in some applications. However, using leaf cones that small may be prohibitive based on current computer processing speeds (and current display resolutions, which can approach 2,000,000 pixels per frame). The larger the leaf cone, the more objects that may be rendered in an attempt to ensure that no visible objects are left out of the rendering process.

The reason for comparing cones against an object's bounding hull instead of the object itself is that the object itself may comprise thousands or more graphics primitives (e.g., polygons, NURBS, subdivision surfaces). It would be overly time consuming to examine each graphics primitive individually (particularly when large numbers of leaf cones are used). Thus, a bounding hull is used instead of the actual object's graphics primitives. In one embodiment, the bounding hull may be formed by performing a simple search of the geometry information for the object and selecting the maximum and minimum coordinate components for each axis (e.g., Xmax, Xmin, Ymax, Ymin, and Zmax, Zmin).

Turning now to FIG. 1, one example of this process is shown. For example, bounding hull 130 is formed by selecting the maximum and minimum bounds of object 120. Similarly, bounding hulls 132 and 134 are formed by selecting the maximum and minimum bounds of objects 122 and 124, respectively. Individual bounding hulls may be grouped together (e.g., bounding hulls 130 and 132) to form larger bounding hulls such as box 136. As noted above, these bounding hulls may be stored as part of the scene graph. If the object is translated, the object's bounding hull may also be translated. However, the larger bounding hulls may need to be recalculated after one or more objects in the scene graph move.

As described above, a cone (e.g., cone 152) may be applied to the bounding hulls to determine if any of the objects intersecting the cone may be visible from viewpoint 110. However, certain objects (e.g., irregularly shaped objects or objects with holes) may have a significantly smaller occluding volume than the bounding hulls which contain them. While an object B (or some portion thereof) may be visible behind an object A, a naïve visibility determination method that operates on the hulls alone may fail to report object B as visible within respect to given cone because the hull of object A may occlude object B.

Referrring now to FIGS. 2A, 2B, 3A and 3B, two examples are shown of objects that occlude more distant objects significantly less than the size or volume of their hulls would indicate. In FIG. 2A, object 156 is one such lightly occluding object. As the figure illustrates, the irregular shape of object 156 generates a bounding hull 158 that is much larger than object 156 (based on volume). In the figure, view frustum 152 from viewpoint 110 is divided into sub-cones 152A–F (as demarcated in the figure by dashed lines). As described above, each sub-cone may be further divided until subcones of a desired size are reached (e.g., based on the resolution of the frame being rendered, the complexity of the scene being rendered, etc.).

Figure 2B:
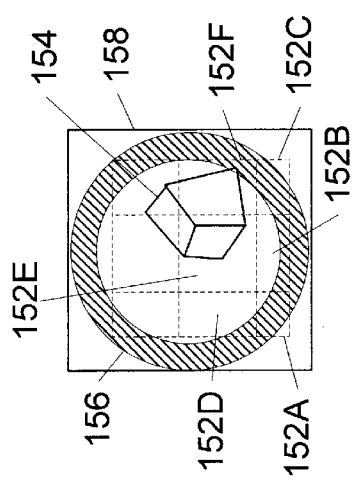

The process of comparing bounding hulls with cones described above is illustrated below using the example illustrated in the figure. First, the bounds of cone 152 (i.e., the entire view frustum) are compared with bounding hull 158. If cone 152 did not intersect bounding hull 158, then object 156 could be culled because the process would have determined that the object did not intersect the current view frustum. In this example, however, bounding hull 158 does intersect cone 152. Thus, the comparison process continues by breaking cone 152 into sub cones (e.g., sub cones 152A–152F). Each sub cone is applied to the bounding hull 158. As shown in the figure, each sub cone does intersect bounding hull 158. Thus, if the visibility determination method operates naively on hulls alone (i.e. without consulting ancillary object geometry) and keeps only the single closest object per leaf cone (i.e. N=1), object 156 would be reported as visible while object 154 would not. However, as FIG. 2B illustrates, this would result in an incorrect image because object 154 should be visible through the hollow center of object 156 (e.g., in subcone 152E).

Figure 3A:
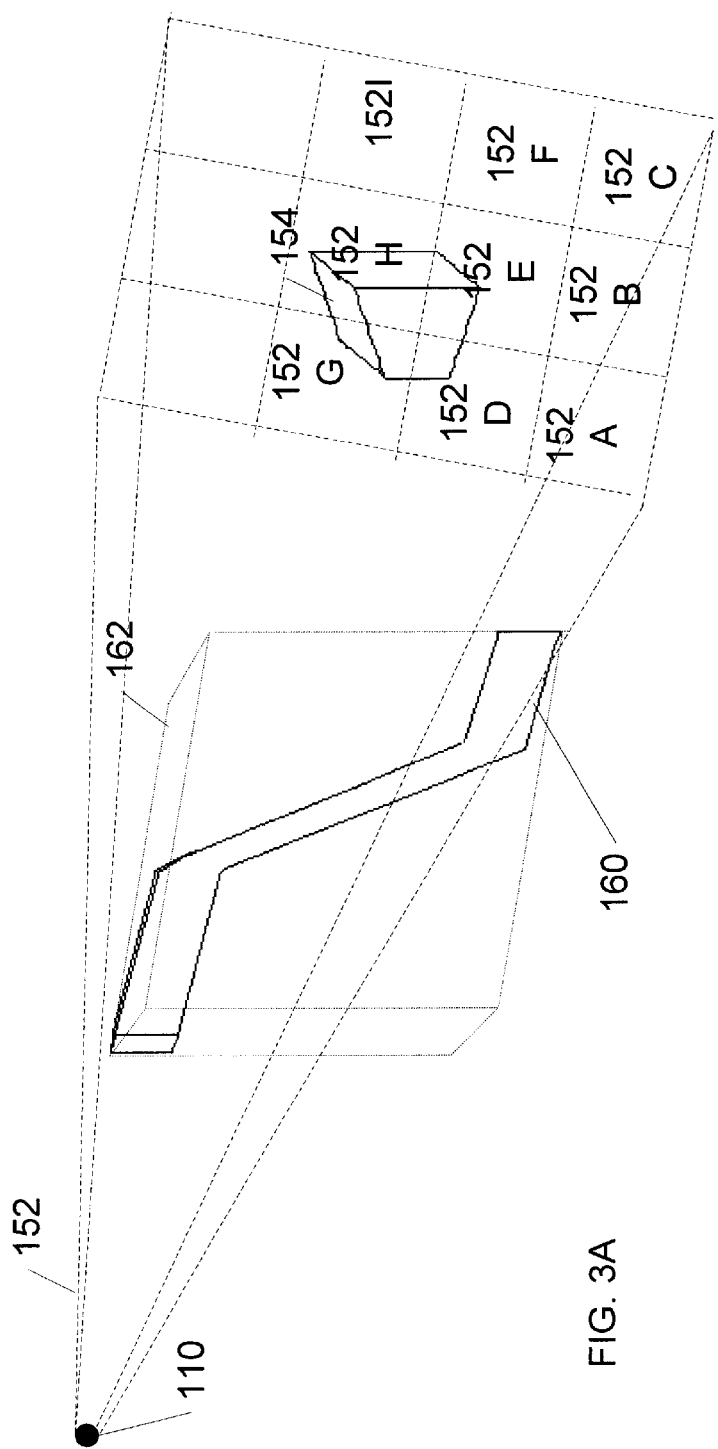
FIGS. 3A–B illustrate another example of an object that occludes much less than the volume of its bounding hull 162 would indicate.
Figure 3B:
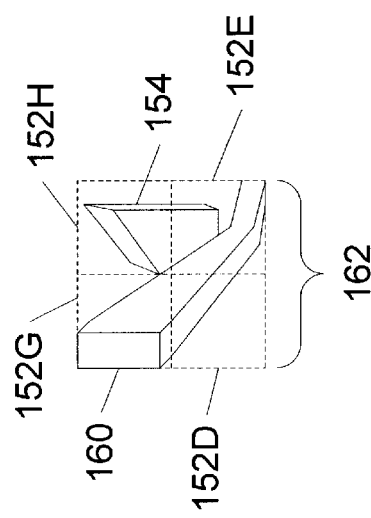

Referring now to FIGS. 3A–B, another example of an object 160 that is lightly occluding is shown. In this case, object 160 is a long and thin object that is bent twice. Object 160 occupies much less area than its bounding hull 162.

Again, if the visibility determination method operates naively on hulls alone and keeps only the single closest object per leaf cone, object 160 would be reported as visible while object 154 would not. However, as illustrated by FIG. 3B object 154 is visible behind object 160 at least in subcones 152E and 152H.

Figure 4:
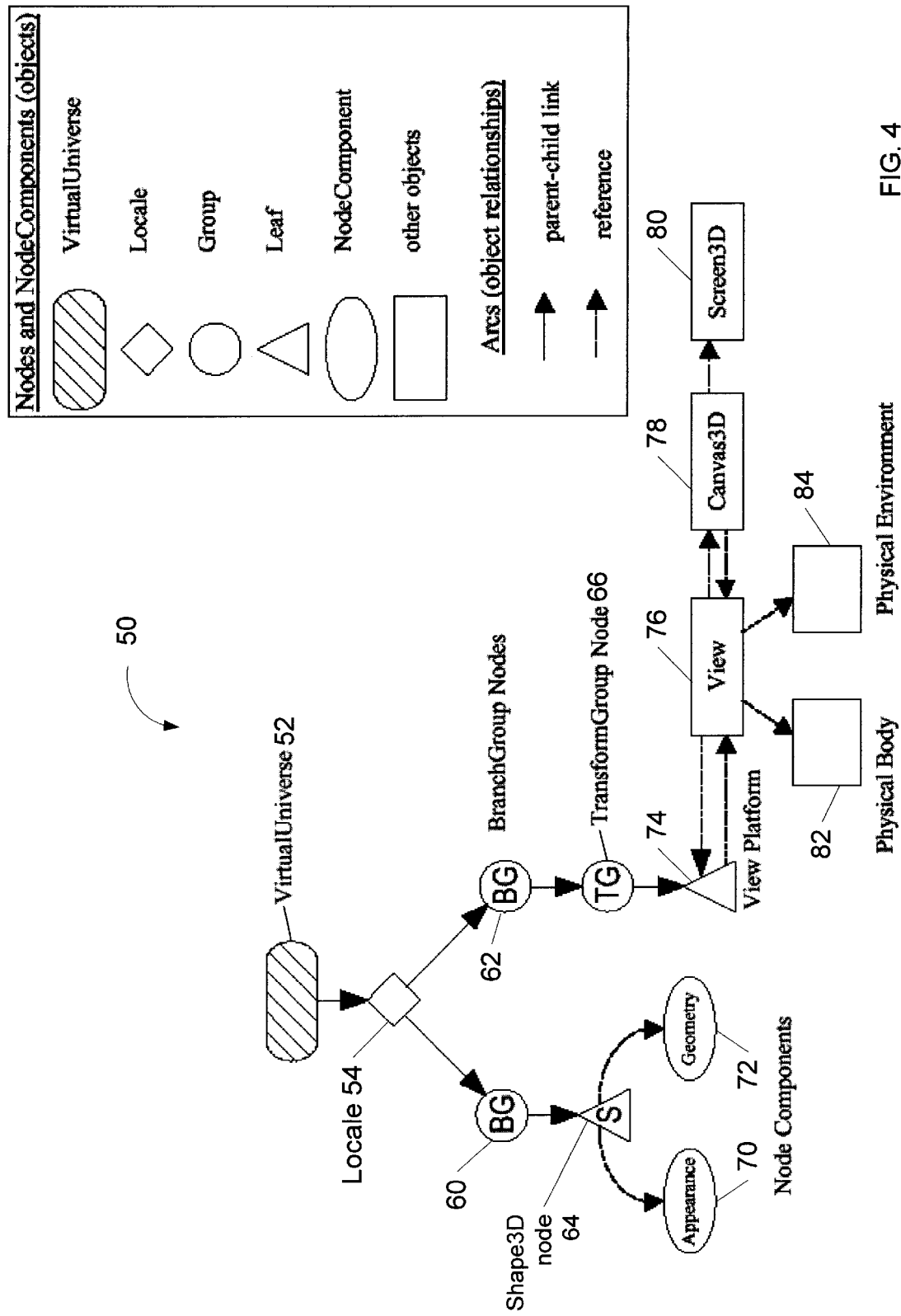
FIG. 4 illustrates one embodiment of a scene graph.
Figure 5:
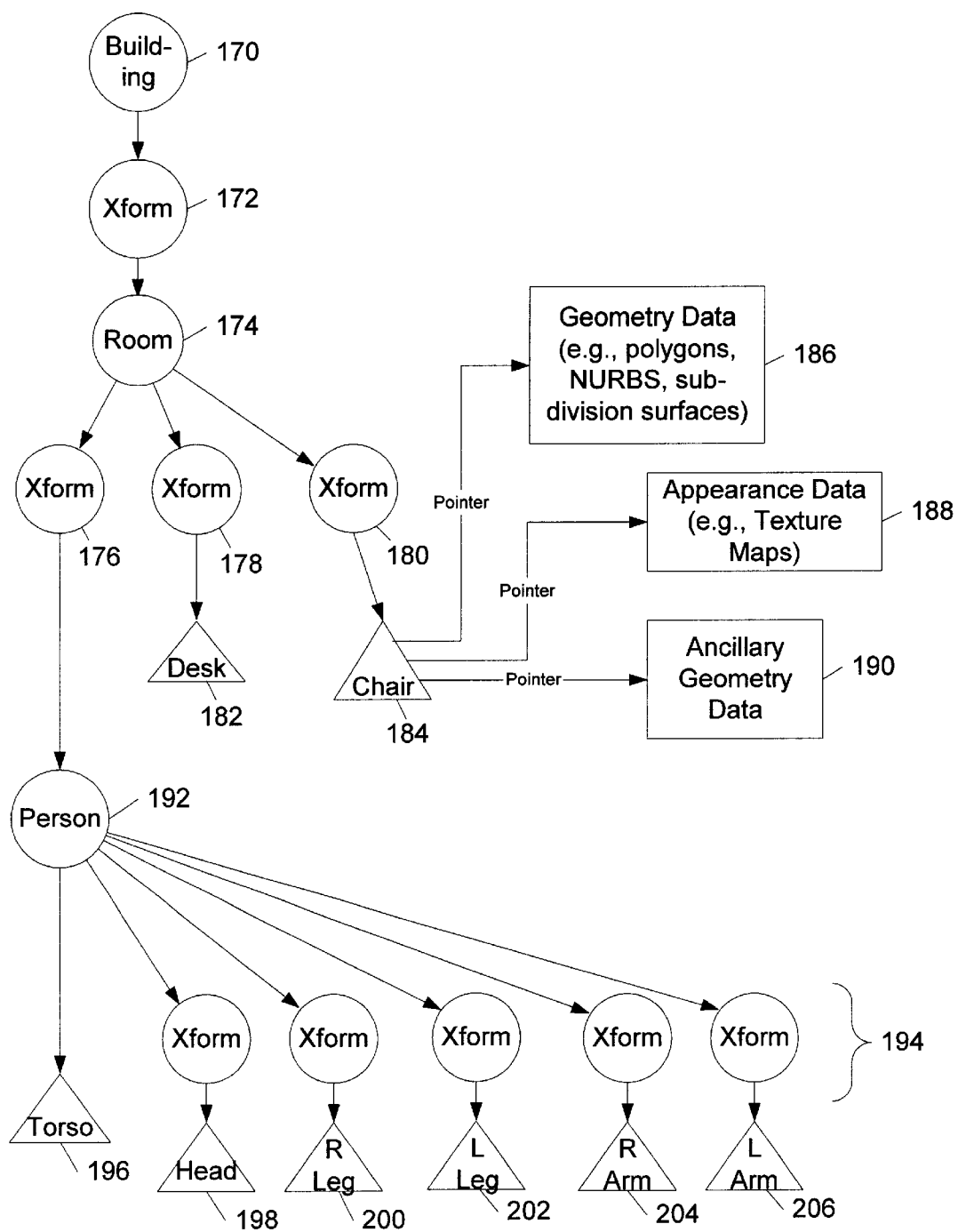
FIG. 5 illustrates another embodiment of a scene graph.

FIGS. 4–5: Scene Graph

Before describing the method for reducing the potential for improper object culling, details of two embodiments of scene graphs usable to implement the method are disclosed.

Turning now to FIG. 4, one embodiment of a scene graph 50 is shown. In this example, scene graph 50 is created from instances of Java 3D™ classes (Java 3D is a trademark of Sun Microsystems, Inc.), but other types of scene graphs are also possible and contemplated (e.g., VRML scene graphs). Scene graph 50 is assembled from objects that define the geometry, sound, lights, location, orientation, and appearance of visual and audio objects.

As illustrated in the figure, scene graph 50 may be thought of as a data structure having nodes and arcs. A node represents a data element, and an arc represents the relationship between data elements. In the figure, nodes 54–66 and 74 of scene graph 50 are the instances of Java 3D classes. The arcs represent two types of relationships between the Java 3D class instances. The first type of relationship is a parent-child relationship. For example, in this embodiment a group node such as branch group node 60 can have any number of children (such as Shape3d leaf node 64), but only one parent (i.e., locale node 54). Similarly, a leaf node has one parent but no children. These relationships are indicated in the figure by solid lines. The second type of relationship is a reference. A reference associates a particular node component object with a scene graph node. Node component objects define the geometry and appearance attributes used to render the visual objects. References are indicated in the figure by dashed lines.

As shown in the figure, Java 3D scene graph 50 is constructed of node objects in parent-child relationships forming a tree structure. In a tree structure, one node (e.g., VirtualUniverse node 52 in the figure) is the root. Other nodes are accessible by following arcs from the root. Scene graph 50 is formed from the trees rooted at locale object 54. The node components and reference arcs are not part of the scene graph tree. Since only one path exists from the root of a tree to each of the leaves, there is only one path from the root of a scene graph to each leaf node. The path from the root of scene graph 50 to a specific leaf node is called the leaf node's "scene graph path." Since a scene graph path leads to exactly one leaf, there is one scene graph path for each leaf in the scene graph 50.

Each scene graph path in a Java 3D scene graph completely specifies the state information of its leaf. State information includes the location, orientation, and size of a visual object. Consequently, the visual attributes of each visual object depend only on its scene graph path. The Java 3D renderer takes advantage of this fact and renders the leaves in the order it determines to be most efficient. The Java 3D programmer normally does not have control over the rendering order of objects.

Graphic representations of a scene graph can serve as a design tool and/or documentation for Java 3D programs. Scene graphs are drawn using standard graphic symbols as shown in the figure. Java 3D programs may have many more objects than those of the scene graph.

To design a Java 3D virtual universe, a scene graph is drawn using the standard set of symbols. After the design is complete, that scene graph drawing may be used as the specification for the program. After the program is complete, the same scene graph is a concise representation of the program (assuming the specification was followed). Thus, a scene graph drawn from an existing program documents the scene graph the program creates.

Turning now to FIG. 5, another embodiment of a scene graph is shown. In this embodiment, the scene graph includes a group node 170 (representing a building), transform nodes 172, 176, 178, 180, and 194 (translating the position and/or changing the orientation of child nodes), a group node 174 (representing a particular room within the building), a leaf node 182 (representing a desk in the particular room), a leaf node 184 (representing a chair in the particular room), a group node 192 (representing a person within the particular room), and leaf nodes 196–206 (each representing a different portion of the person).

As shown in the figure, leaf node 184 includes a pointer to geometry data 186. Geometry data 186 may include geometric primitives such as polygons, NURBs, subdivision surfaces. In some embodiments, geometry data 186 may be stored in a compressed form until it is needed for rendering. Leaf node 184 also includes a pointer to appearance data 188. Appearance data 188 may include additional information about the appearance of the object represented by leaf node 184 (in this example a chair), such as texture maps, bump maps, and other surface characteristics. Leaf node 184 may also include a pointer to a set of ancillary geometry data 190. Ancillary geometry data 190 may include one or more fundamental surfaces (e.g., cubes, spheres, cylinders), NURB surfaces, or a collection of polygons. The ancillary geometry may be obtained either through a manual process, or through an automated decimation process.

In some embodiments, ancillary geometry 190 may be used for other purposes in addition to improving visibility determination. For example, ancillary geometry 190 may be used for collision detection. Collision detection is the detection of collisions or contact between moving objects. Collision detection is fundamental to simulations of the physical world. There are a number of different algorithms currently in use for collision detection. Examples of these algorithms include the Lin-Canny closest features algorithm, V-CLip, I-Collide, OBB-tree, and KDS. Depending on the implementation and the accuracy needed for the collision detection, in some embodiments it may be possible to utilize the ancillary geometry to perform the collision detection in lieu of using the object's actual geometry.

In some embodiments ancillary geometry 190 may also be used as a different level of detail (LOD) for the object represented by leaf node 184. For example, in some applications if an object is far away from the current viewpoint but nevertheless visible, using less detailed geometry may reduce the amount of processing time required to render the distant object. However, because the object is distant, the reduction in image quality may not be noticeable to the viewer. Since the ancillary geometry is selected to provide a reasonable approximation of the object without the level of detail of the object's actual geometry, the ancillary geometry may provide a useful lower level of detail for the object. In these embodiments the ancillary geometry may include additional information (e.g., color information for vertices) in addition to the bare geometry data.

Figure 6:
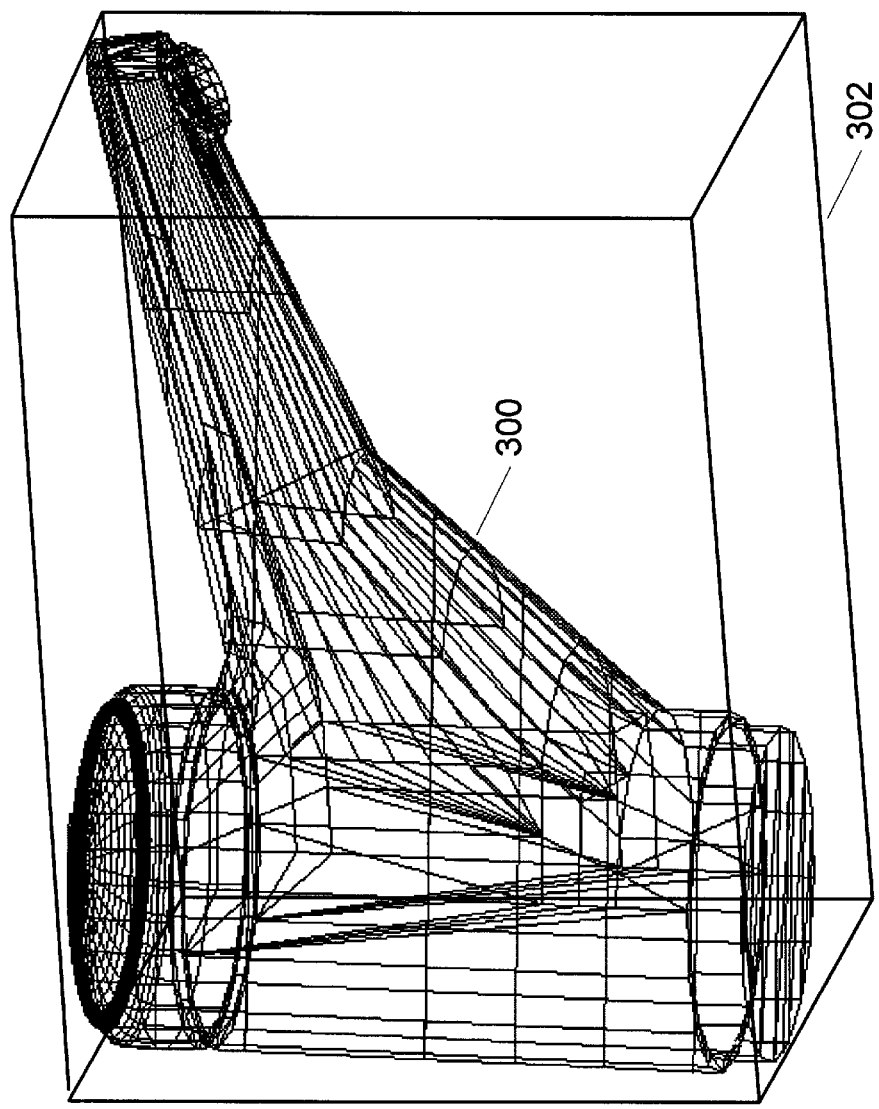
FIGS. 6, 7 and 8 illustrate different embodiments of ancillary geometry for the visibility culling of objects.
Figure 7:
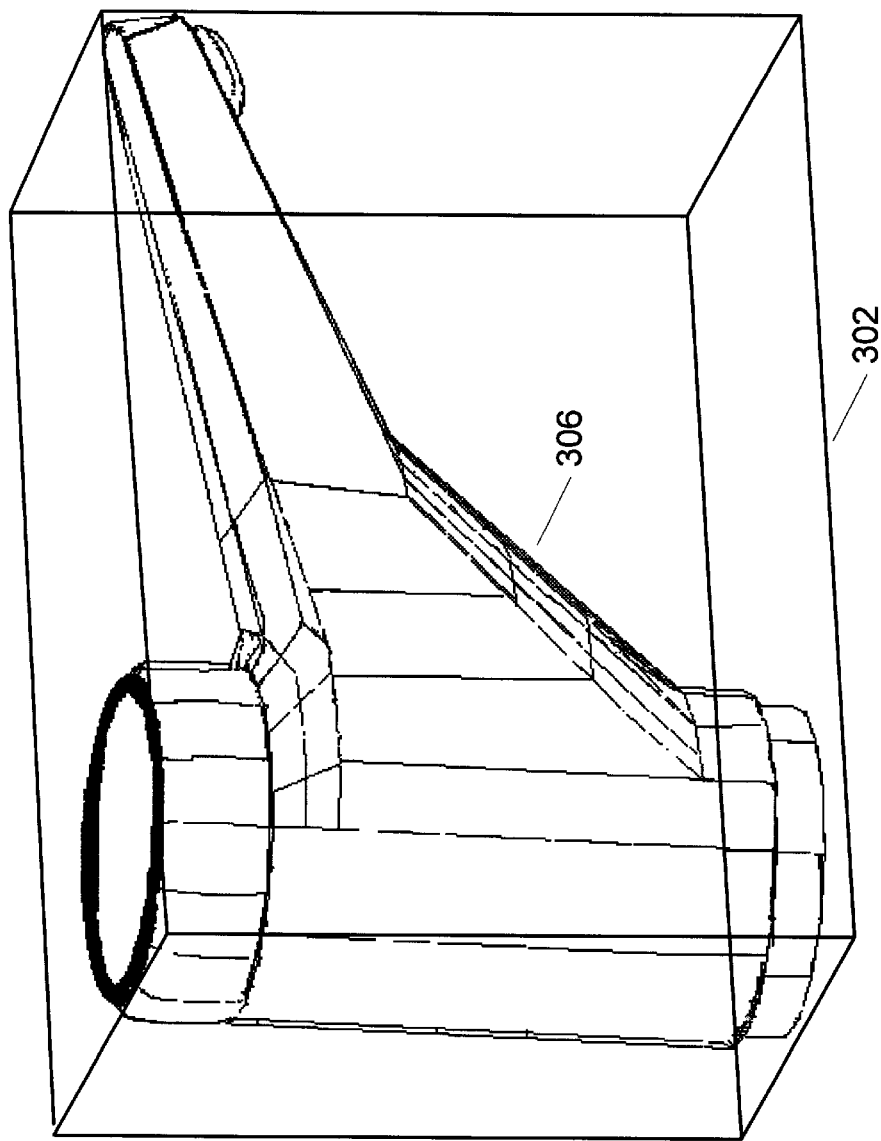
Figure 8:
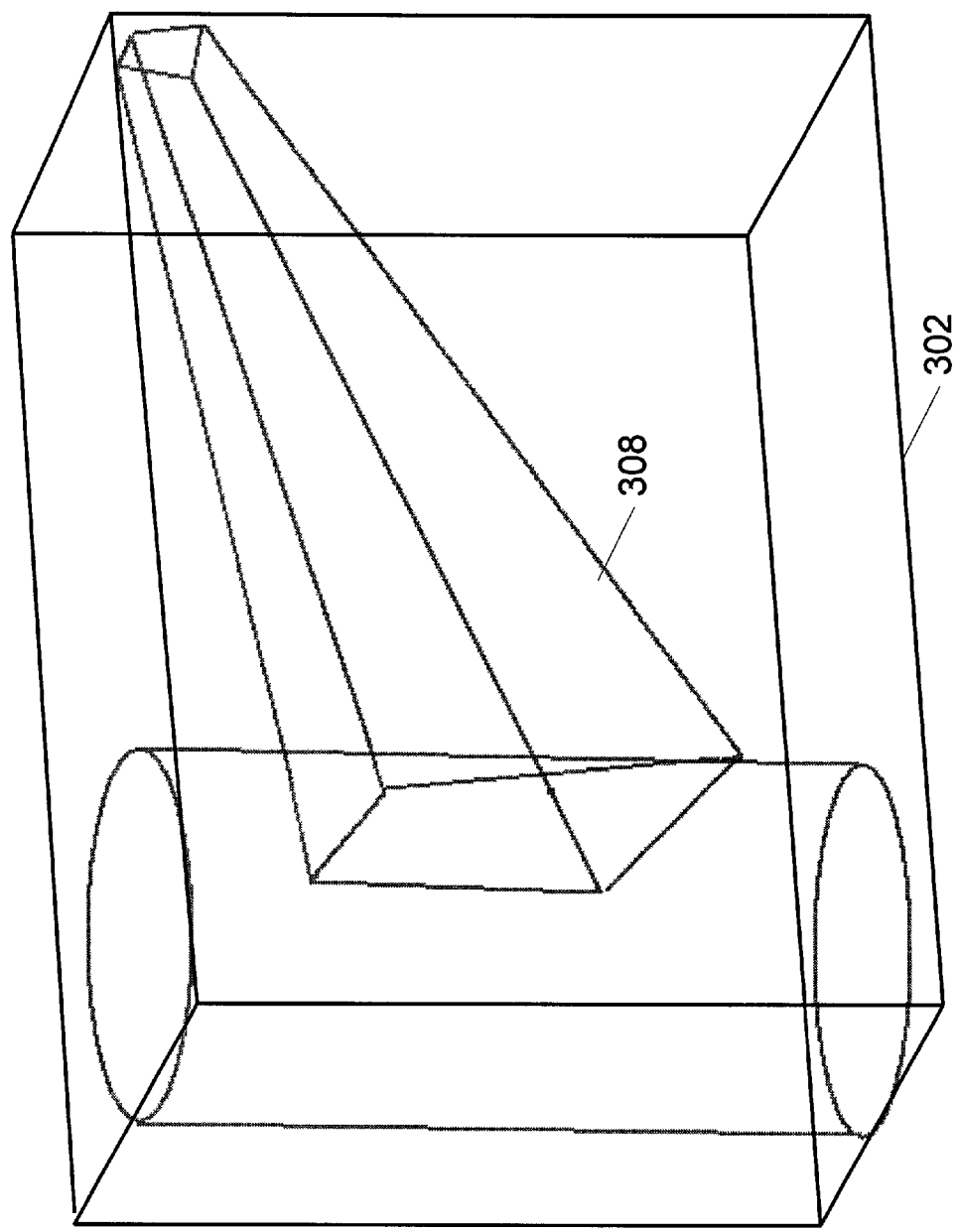

FIGS. 6–8: Ancillary Geometry

Turning now to FIGS. 6–8, an example of a method for reducing the potential for improper obscuring is shown. In FIG. 6, object 300 is shown comprising a large number $L_1$ of polygons. As this figure illustrates, attempting to compare a cone (or cone tree/hierarchy) with the object at the indicated polygon resolution would be time consuming, and in many applications, impractical. Thus, using bounding hull 302 for visibility determination is one solution. However, as noted above, using bounding hull 302 has several potential problems, including the possibility of causing one or more objects farther behind object 300 to be rejected (i.e., not recognized as visible) in the visibility search.

Turning now to FIG. 7, one example of ancillary geometry 306 corresponding to object 300 of FIG. 6 is shown. In this example, vertex decimation was used to reduce the number of polygons to a more reasonable level. Since the number of polygons in ancillary geometry 306 is much smaller than for the actual geometry of object 300 in FIG. 6, it may be possible to compare ancillary geometry 306 with a given cone at increased speed relative to the actual geometry of the object. In addition, ancillary geometry 306 provides a significantly more accurate bounding information for comparison with visibility subcones than bounding hull 302. The volume of the bound provided by ancillary geometry 306 is significantly smaller than the bound provided by hull 302.

Turning now to FIG. 8, another embodiment of ancillary geometry 308 for object 300 of FIG. 6 is shown. In this example, ancillary geometry 308 comprises a cylinder and a polyhedron. While ancillary geometry 308 is greatly simplified with respect to the original geometry of object 300 of FIG. 6, it nevertheless provides a better approximation for visibility determination than the bounding hull 302. Thus, ancillary geometry may advantageously be compared with a particular cone or sub-cone in lieu of, or in addition to, comparing bounding hull 302 with the sub-cone of interest.

Figure 9:
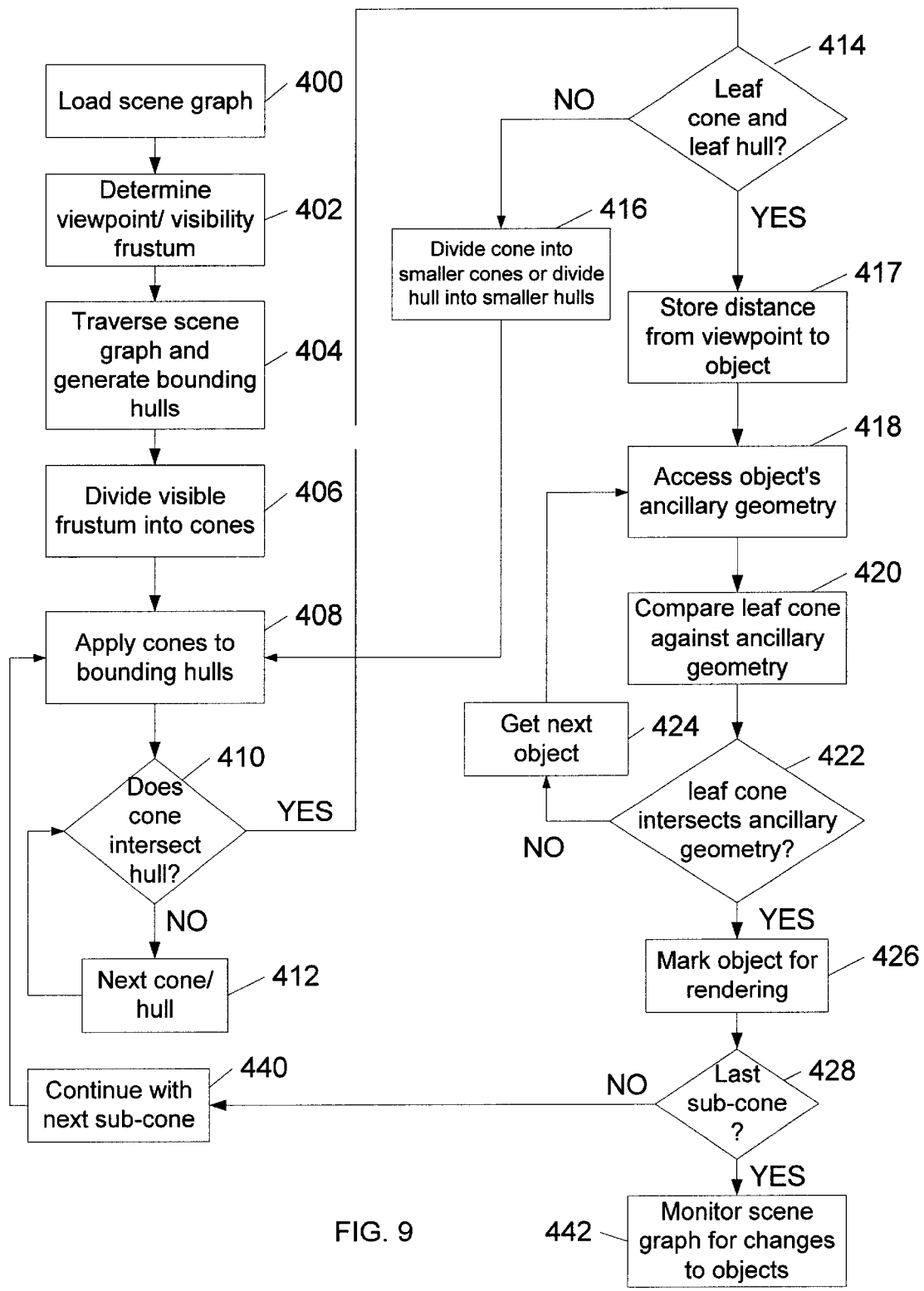
FIG. 9 is a flowchart illustrating one embodiment of a method for visibility culling.

FIG. 9: Method for Using Ancillary Geometry in Visibility Culling

Turning now to FIG. 9, one embodiment of a method for utilizing alternative geometry for object culling is shown. First, a scene graph is loaded (step 400). This may include downloading all or part of the scene graph from a remote server across a network, or reading the scene graph from a medium such as a CD-ROM, DVD-ROM, or computer tape. Next, the current viewpoint and visibility frustum is determined (step 402).

Next, the scene graph is traversed and bounding hulls are generated (step 404). As described above, bounding hulls may change from time to time depending on the corresponding object's size, orientation and/or position within the world/scene coordinate system. Similarly, bounding hulls may also change as the result of changes in the corresponding object itself. For example, a bounding hull corresponding to a person may change in shape and size as the person moves their arms and legs and torso to change position.

Next, the visibility frustum is divided into a plurality of cones (step 406). Each of these cones is then applied to the hierarchy of bounding hulls previously generated (step 408). For each cone, each bounding hull is compared to determine if there is an intersection (step 410). If there is no intersection, the next cone and/or hull is compared (step 412). If, however, the cone and hull do intersect, then if the cone is a leaf cone and the hull is a leaf hull (step 414), the distance from the view point to the object or bounding hull is stored (step 417). If, however, the cone is not a leaf cone or the hull is not a leaf hull, then the cone and/or hull are divided into smaller subcones and/or smaller hulls, respectively (step 416).

As noted above, in selected methods of visibility determination, distances to the N closest objects for each subcone (leaf cone) are stored. This enables a renderer to render only the N closest visible objects to the view point. After the distance is stored, the corresponding object's ancillary geometry may be accessed (step 418). This may include actually generating the ancillary geometry on the fly (and then storing it in memory and adding a corresponding pointer to it in the scene graph so that it may be reused) or reading pre-generated ancillary geometry from memory or a separate data file. The leaf cone is then compared against the ancillary geometry (step 420). If the leaf cone and the ancillary geometry do not intersect (step 422), then the next object may be retrieved (step 424), and its ancillary geometry may be accessed and compared with the leaf cone. If, however, the leaf cone and the ancillary geometry do intersect, then the object may be tagged or marked for rendering (step 426). This process may be repeated for each subcone (step 428). If additional subcones are present, then the process may be repeated for these additional subcones (step 440). Similarly, the scene graph itself may be monitored to detect changes to the objects (step 442).

Examples of changes to objects that may require the scene graph to be traversed anew, include changes in object position, changes in view point and view visibility frustum orientation.

In various embodiments, the methods described above may be implemented (a) in software on programmable hardware (e.g. one or more microprocessors), (b) on dedicated hardware alone, or (c) in a combination of programmable hardware and dedicated hardware. The particular method illustrated in FIG. 9 is for exemplary purposes, and is not meant to be limiting. For example, some of the steps illustrated in FIG. 9 may be performed in a different order or in parallel with other steps. In other embodiments some of the steps may be combined, eliminated, replaced, or supplemented by other steps.

When leaf nodes of a scene graph's object-bounding hierarchy are reached in the visibility culling process, false occlusions may be prevented by testing the cone against the leaf node's actual geometry. However, such tests tend to be prohibitively expensive when the models have high numbers of geometric primitives (e.g., polygons), or if their geometry has been compressed. Thus, ancillary geometry may be used for the cone comparison in place of the actual geometry. The ancillary geometry may be a union of one or more analytic surfaces (e.g., spheres, cylinders, polynomial surfaces), NURBs, polytope hulls, polygons, or any combination thereof. The ancillary geometry for an object may be generated manually or through a process of automated decimation.

In some embodiments, visibility determination methods may be configured to operate using rays and/or probe cones to determine object visibility. In these embodiments, a ray may be projected from the viewpoint to determine if any of the bounding hulls are intersected. Once an object's bounding hull is determined to intersect the ray, the object's ancillary geometry may be used to perform a second more accurate comparison (i.e., without requiring a more time-consuming comparison of the ray against the object's actual geometry).

The various method embodiments described above may be implemented as a sofware program stored on any of a variety of memory media such as magnetic disk, bubble memory, CD-ROM, magnetic tape, semiconductor memory (various types of RAM and/or ROM), etc.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A method for performing visibility culling, the method comprising:
   receiving a scene graph including graphics data describing a plurality of graphics objects,
   generating one or more bounding hulls for the graphics objects,
   determining ancillary geometry for the graphics objects,
   performing a first visibility determination on a first graphics object using one or more of the corresponding bounding hulls, and
   if the first graphics object is determined to be visible by the first visibility determination, performing a second visibility determination on the first graphics object using the ancillary geometry corresponding to the first graphics object, and
   if the first graphics object is determined to be visible by the second visibility determination, identifying the corresponding graphics object as visible for rendering.

2. The method of claim 1, wherein each graphics object comprises a plurality of graphics primitives, wherein the ancillary geometry comprises one or more graphics primitives, wherein the ancillary geometry for each graphics object comprises fewer graphics primitives than the particular graphics object.

3. The method of claim 2, wherein the graphics primitives are polygons.

4. The method of claim 2, wherein the graphics primitives include sub-division surfaces.

5. The method of claim 2, wherein the graphics primitives include non-uniform rational B-spline (NURB) surfaces.

6. The method of claim 1, further comprising storing the ancillary geometry in a memory as part of the scene graph.

7. The method of claim 1, further comprising adding one or more pointers to the scene graph, wherein the pointers point to the ancillary geometry.

8. The method of claim 1, further comprising:
   detecting visible changes in the graphics objects; and
   updating the ancillary geometry for at least the one or more of the changed graphics objects.

9. The method of claim 8, wherein the visible change is a deformation.

10. The method of claim 1, further comprising:
    detecting transformations of one or more of the graphics objects; and
    updating the ancillary geometry for at least the one or more transformed graphics objects.

11. The method of claim 1, further comprising:
    detecting rotations of one or more of the graphics objects; and
    updating the ancillary geometry for at least the one or more rotated graphics objects.

12. The method of claim 1, wherein the ancillary geometry is determined by selecting one of a plurality of sets of geometry data, wherein each set of geometry data corresponds to a different level of detail for the object, wherein the selected level of detail comprises fewer graphics primitives than the largest level of detail, and wherein the object is configured to be rendered at a level of detail independent from the level of detail selected for the ancillary geometry.

13. The method of claim 12, wherein the scene graph comprises one or more pointers to the graphics data.

14. The method of claim 1, wherein the ancillary geometry is determined by vertex decimation.

15. The method of claim 1, wherein the ancillary geometry is determined by replacing a plurality of graphics primitives corresponding to the object with a single graphics primitive that approximates the plurality of graphics primitives corresponding to the object.

16. A computer program embodied on a computer-readable medium, wherein the computer program comprises a plurality of instructions configured to:
    receive information describing a scene graph, wherein the scene graphic includes graphics data describing a plurality of graphics objects, wherein each graphics object comprises a plurality of graphics primitives;
    comparing a portion of a selected visibility frustum with a bounding hull that corresponds to one or more of the graphics objects; and
    if the portion of the selected visibility frustum intersects the bounding hull, comparing the portion of the selected visibility frustum with ancillary geometry corresponding more closely to the one or more graphics objects than the bounding hull; and
    if the portion of the selected visibility frustum intersects the ancillary geometry, identifying the one or more graphics objects for rendering.

17. The computer program of claim 16, wherein the ancillary geometry comprises more information about the graphics object than the bounding hull and less information about the graphics object than the corresponding plurality of graphics primitives.

18. The computer program of claim 16, wherein the plurality of instructions are further configured to determine the ancillary geometry by selecting a particular set of geometry data corresponding to a particular level of detail for the one or more graphics objects.

19. The computer program of claim 16, wherein the plurality of instructions are further configured to determine the ancillary geometry by decimating vertices in the graphics data.

20. The computer program of claim 16, wherein the graphics data comprises polygons.

21. The computer program of claim 16, wherein the graphics data comprises sub-division surfaces.

22. The computer program of claim 16, wherein the graphics data comprises surfaces defined by non-uniform rational B-splines (NURBs).

23. A method for performing visibility culling, the method comprising:
    receiving a set of graphics data, wherein the graphics data describes a plurality of graphics objects, wherein each graphics object comprises a plurality of graphics primitives;
    generating a hierarchy of bounding hulls corresponding to the graphics objects;
    comparing a portion of a selected visibility frustum with a particular bounding hull that is the lowest level in the hierarchy and that corresponds to one or more selected graphics objects; and
    if the portion of the selected visibility frustum intersects the bounding hull, comparing the portion of the selected visibility frustum with alternate geometry corresponding to the one or more selected graphics objects, wherein the alternate geometry is not used for rendering the object; and
    if the portion of the selected visibility frustum intersects the alternate geometry, identifying the one or more selected graphics objects for rendering.

24. The method of claim 23, wherein the alternate geometry corresponds to a particular level of detail for the one or more selected graphics objects, wherein the graphics objects are renderable in a different level of detail than the particular level of detail.

25. The method of claim 23, wherein the set of graphics data includes the alternate geometry.

26. The method of claim 23, wherein the set of graphics data includes a pointer to the alternate geometry.

27. The method of claim 23, further comprising generating the alternate geometry by vertex decimation.

28. A method for generating displayable images, the method comprising:

searching a hull tree and a cone tree to determine one or more visibile objects;

performing rendering computations on the one or more visible object for the first leaf cone to generate displayable pixels;

wherein said searching the hull tree and the cone tree includes (a) determining that a leaf hull of the hull tree intersects a first cone of the cone tree, (b) accessing ancillary geometry for an object corresponding to the leaf hull, (c) determining visibility of the object with respect to the first cone based one the ancillary geometry.

29. A method for generating displayable images, the method comprising:

searching a hull tree and a cone tree to determine one or more visibile objects;

performing rendering computations on the one or more visible object for the first leaf cone to generate displayable pixels;

wherein said searching the hull tree and the cone tree includes (a) determining a cone-hull distance between a first leaf hull of the hull tree and a first cone of the cone tree, (b) computing an ancillary distance of an object corresponding to the leaf hull with respect to the first cone based on ancillary geometry for the object in response to the cone-hull distance being smaller than a visibility distance value associated with the first cone, and (c) updating the visibility data including the visibility distance value associated with the first cone if the ancillary distance is smaller than the visibility distance value.

* * * * *